Nov. 29, 1932.　　　　G. SEBILLE　　　　1,889,575
METHOD AND APPARATUS FOR READING BOOKS AND THE LIKE
Filed July 23, 1929　　4 Sheets-Sheet 1

Georges Sebille
INVENTOR;
By (signature)
his Attorney.

Nov. 29, 1932.   G. SEBILLE   1,889,575
METHOD AND APPARATUS FOR READING BOOKS AND THE LIKE
Filed July 23, 1929   4 Sheets-Sheet 2
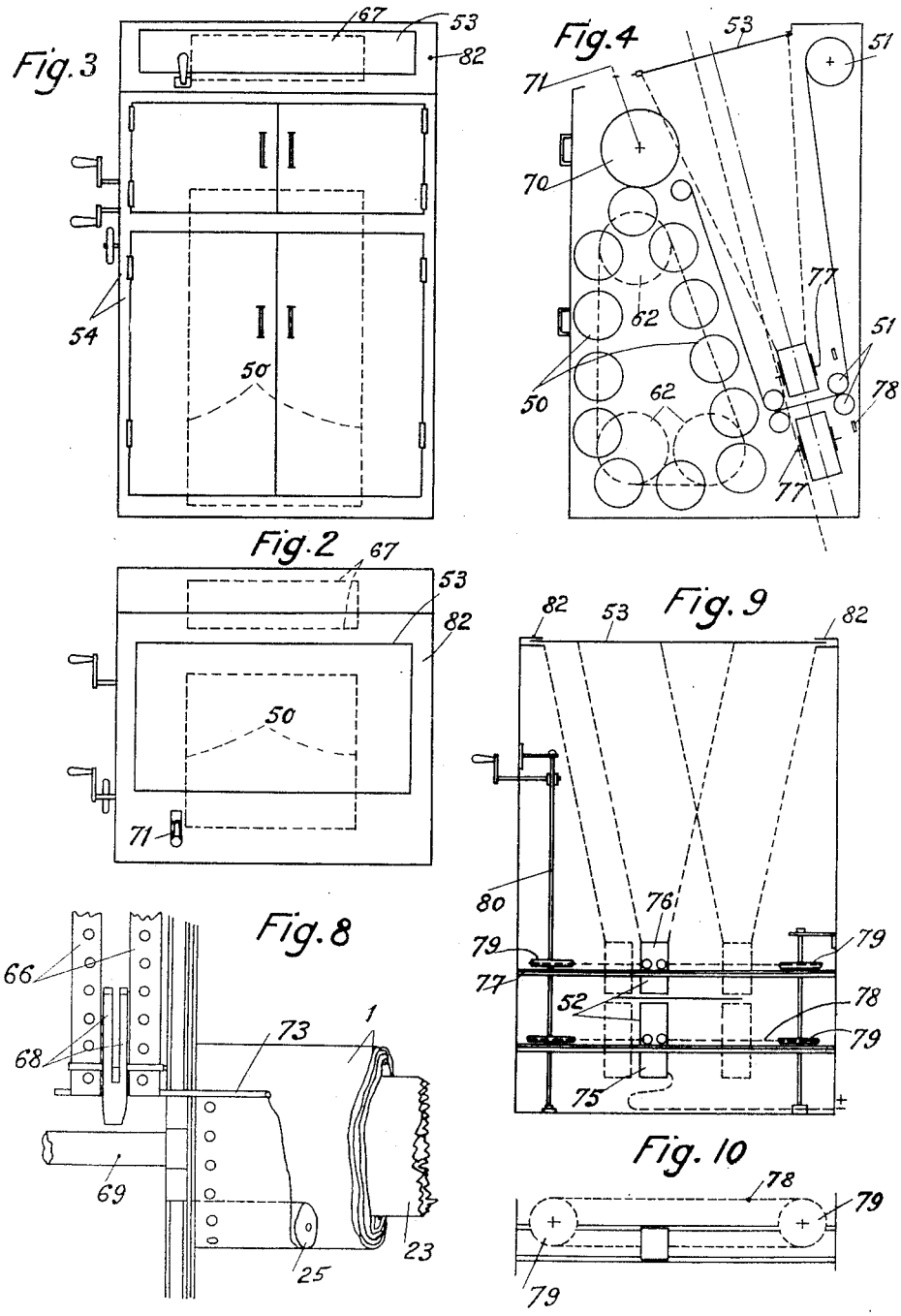

Nov. 29, 1932.  G. SEBILLE  1,889,575
METHOD AND APPARATUS FOR READING BOOKS AND THE LIKE
Filed July 23, 1929  4 Sheets-Sheet 3
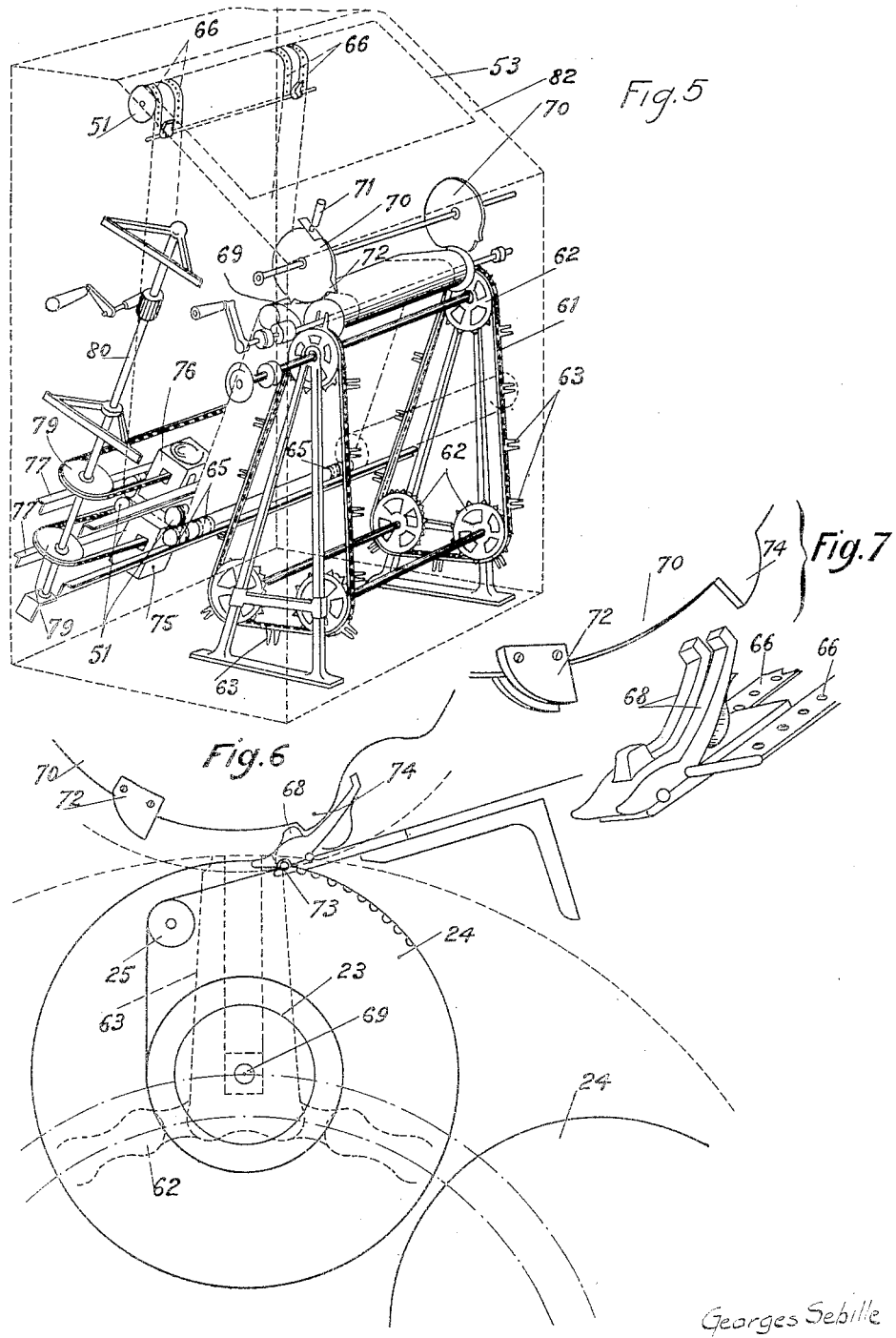
Georges Sebille
INVENTOR
By
his Attorney Nov. 29, 1932.    G. SEBILLE    1,889,575
METHOD AND APPARATUS FOR READING BOOKS AND THE LIKE
Filed July 23, 1929    4 Sheets-Sheet 4
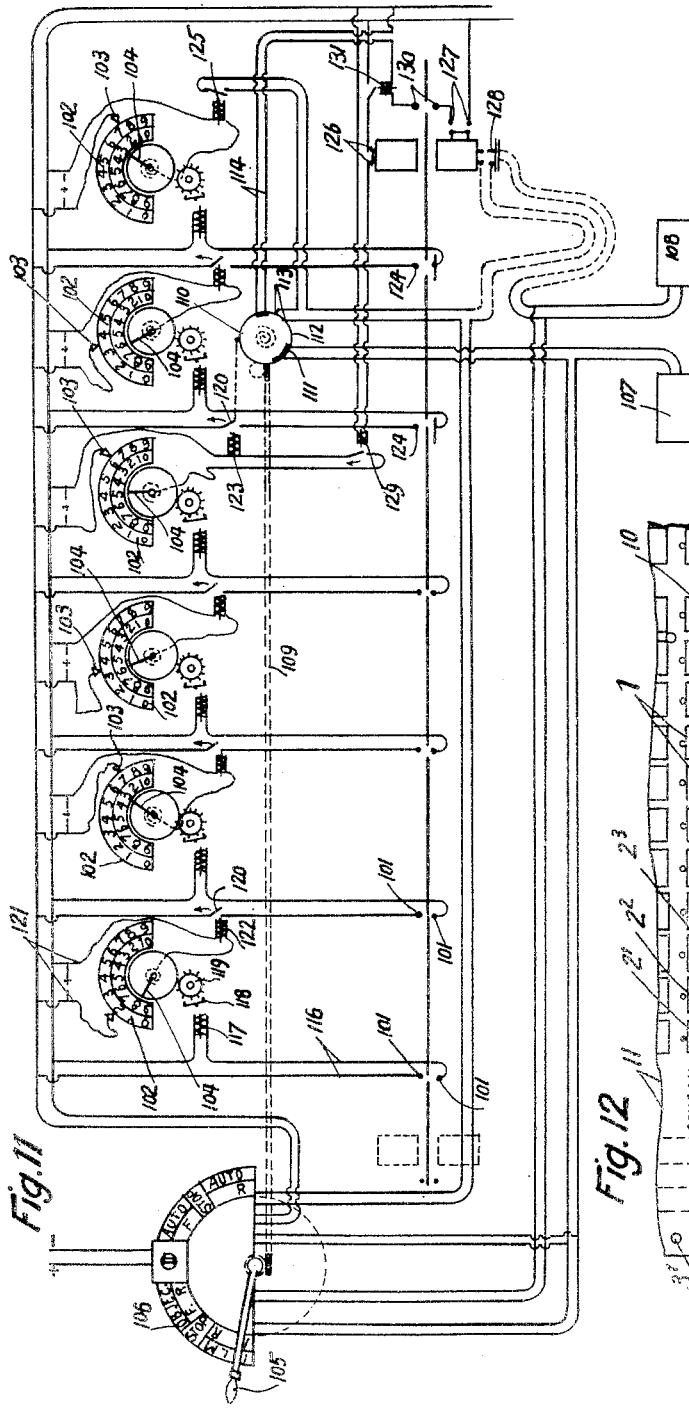
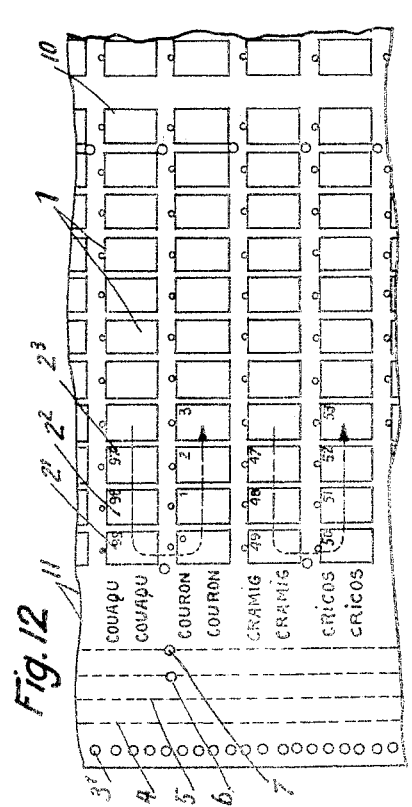
Georges Sebille
INVENTOR
his Attorney Patented Nov. 29, 1932

1,889,575

UNITED STATES PATENT OFFICE

GEORGES SEBILLE, OF PARIS, FRANCE

METHOD AND APPARATUS FOR READING BOOKS AND THE LIKE

Application filed July 23, 1929, Serial No. 380,303, and in France August 2, 1928.

The primary object of the invention is to diminish as far as possible the bulk of printed works and manuscripts, engraved or otherwise, and thus to reduce their cost. A further object is to facilitate consultation of such works and even to permit of an automatic search for a predetermined page. A further object is to reduce the staffs and buildings of existing libraries in consequence. A still further object is to produce an apparatus permitting automatic consultation of works when reduced to a minimum bulk.

The process according to the invention, for the projection on a reading screen of any predetermined part or line of a film of indeterminate length and width on which printed, engraved or other works are carried in the form of microscpic photographs, is characterized by visual selection of the folioing of the work; the text thereof being unwound at a speed such that reading is impossible and in such a way as to enable the film to be stopped at the required part.

This selection can be effected, for instance, by the reading of inscriptions on one side, for example, the left, of the film, indicating that the film is in a position corresponding to the reading of the required page or part.

This selection can also be effected in an automatic manner by means of electric contacts which would stop the film automatically when the required page is in front of the projecting apparatus.

In accordance with one way of carrying out the above process, visual selection is effected cinematographically, i. e. this selection is effected by producing on the retina a series of superposing images of figures, as is explained hereafter in a detailed manner.

The characteristic features of the process described above, and arrangements of the films and apparatus by which this process can be carried out, are explained in the description given below and pointed out with particularity in the claims set forth at the end of this description.

Devices conformable to the invention are shown, by way of example, on the accompanying drawings, in which:—

Figs. 2, 3 and 4 are respectively, a plan, an elevation and a vertical cross-section of an apparatus for projecting this film;

Fig. 5 is a view of this apparatus in perspective;

Figs. 6, 7 and 8 show the device for hooking on the film drawn to a larger scale;

Figs. 9 and 10 indicate diagrammatically the operation of the optical apparatus;

Fig. 11 is a diagrammatic view of the drive of the film automatic actuating device; and Fig. 12 is a part plan view of a film suitable for a variation of this invention.

For the constitution of editions of works on films, films about 0.33 m. in width, for instance, and of variable length, are used, in conformity with the invention. The ratio of reduction may be 1/20 in linear measure or 1/400 in superficial area. A page (of a big dictionary, for example) measuring 0.25×0.30 square metres, including margins, would therefore measure, when reduced, 0.0125×0.015 square metres and the pages would be set out by lines of about 25 pages on a film 0.33 metres wide. An encyclopedia of twenty 1500-page volumes, or 30,000 pages would therefore have a length of $$\frac{30,000 \times 0.015}{25} = 18 \text{ metres.}$$

as a film.

The above film can obviously be projected by means of an ordinary projector to enable it to be read. But in this case the unwinding of the film could only be stopped at the required place after much trial and error. To reduce this to a minimum, either the folioing in the case of an ordinary work, or the letters of alphabetical classification in the case of a dictionary, are repeatedly marked in either or both of the margins in large type. By unwinding the film with a suitable intermittent motion, as in cinematographic exhibition, the folioing or alphabetical classification appears in the projection. The film can therefore easily be stopped at the right place. Further, the lines of pages can be arranged like the words in the so-called "Boustrophedon" writing, from left to right for the first line and the odd lines, and from right to left for the second and the even lines, so as to reduce to a minimum the movements of the projector.

Figure 1:
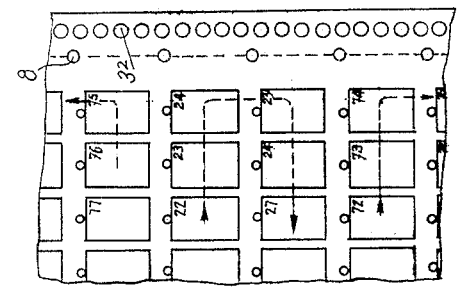
Fig. 1 is a part plan of a film according to this invention.
Figure 1:
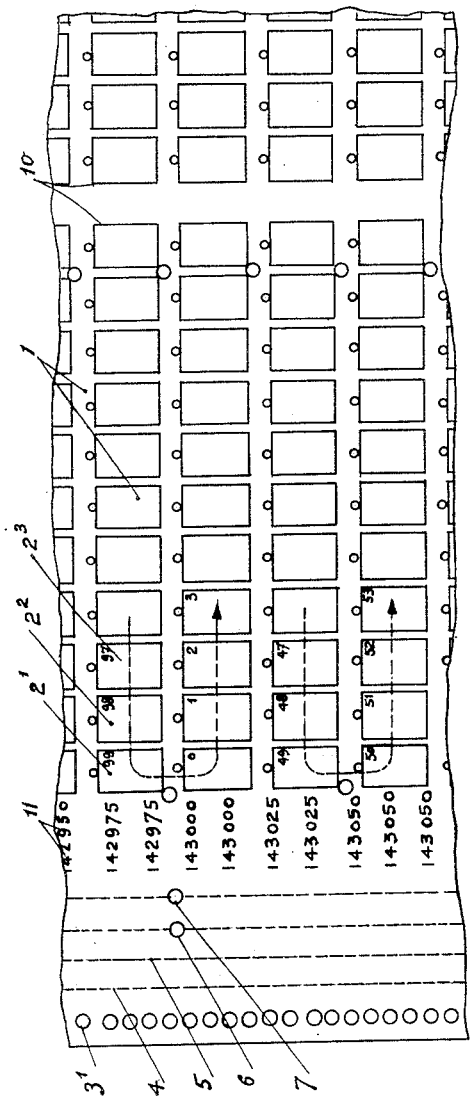

The film is made, for instance, as shown on Fig. 1. It is assumed that a work of any kind, whose pages $2'$, $2^2$ . . . are arranged in lines leaving a clear space 10 towards the middle of the film and which should be read in the direction indicated by the arrows, has been reproduced photographically on this film. A column 11 contains the images of the figures which are to appear cinematographically.

This folioing refers to the series or lines of pages; in the example shown on Fig. 1, it includes the numbers from 142,950 to 143,050.

While unwinding this film in the order of succession of the figures of this folioing, it is evident that, during cinematographic projection, the figures indicating the hundreds of thousands will appear for a longer time than those indicating the tens of thousands, etc. . . . At the speed of twenty-five images per second, the folioing of the hundreds i. e. the figures referring to hundreds, the digit 0 and those to the right, will therefore only be projected four times in succession, and this folioing of the hundreds of pages will be blurred in the cinematographic projection. In the folioing of the thousands, the digit 3 in the example, will appear forty times in succession and will therefore be visible during 40/25ths of a second. The characteristic figure (digit) 4 of the folioing of the tens of thousands will appear 400 times and will therefore be visible during 400/25ths of a second (16 seconds). And so on.

It is evident that the application of cinematographic selection enables the hundreds of thousands, the tens of thousands and the thousands to be found very quickly, after which, by reducing the speed, the hundreds and then the required page can be found very easily.

With a view to automatic working, the film 1 is provided with series of holes arranged as follows:—

Two series of holes $3'$, $3^2$ correspond to the hooking of the film on to the actuating toothed cinematographic drums or the equivalent.

A series of holes 4 controls, as indicated hereafter, the tens of numbers of the volume.

A series of holes 5 corresponds to the units of volumes.

A series of holes 6 to the thousands of numbers of pages.

A series of holes 7 to the hundreds of numbers of pages.

A series of holes 8 which are intended to cause a stoppage at each line in certain cases.

For the volumes, a hole is punched before the first line of the first page of the volume on column 4 starting from the tenth volume and every ten volumes, and a hole 5 before the first page line of each volume. For the thousands of folioing, a hole 6 opposite the page space preceding the line where the thousand begins. For the hundreds of folioing, a hole 7 opposite the page space preceding the line where the hundred begins.

As the pages are arranged in lines of 25, for instance, the hundreds and the thousands will always begin at the beginning of a line. A certain variation in the size of reproduction is nevertheless possible, for if smaller sizes are reproduced, they can be arranged by lines of 33 with a white page every third line, or by lines of 50 or even by lines of 100 in the case of the size 0.06 metres in width. The height of the pages does not matter.

Finally, for the tens, holes 13 are placed at the top and to the left of the first page of the tenth and for the units holes 14 are placed at the head and at the middle of the page itself.

The films are mounted on special metal spools and are provided at their free ends with a strengthening rod 73 (Fig. 8) which enables them to be automatically hooked on to an unwinding device as described below.

The metal spool (Fig. 6) comprises a spindle 23 around which the film 1 is wound and which receives motion through the medium of the clutch 69. This spindle is movable in relation to the cheeks 24. The latter are held motionless against a fork 63. An auxiliary movable roller 25, whose spindle is fixed at its ends on the cheeks 24, causes the film, at any moment during unwinding, to take up a fixed position in relation to the hooking on device described hereafter.

The projector, described hereafter by way of example (Figs. 2 to 10), is designed to allow of speedy consultation without change of place of twelve films similar to that described above, containing therefore in all the contents of 200 volumes of 1500—0.25 m.×0.30 m. pages, or 1200 or 1300 8vo volumes. This projector consists essentially of a magazine 50 supporting twelve rolls which successively come into position adjacent to the hooking-on device; of a cinematographic unwinding and winding device 51 of any suitable kind, the same being fitted with a hooking-on device and also with a winding drum (the drum and the hooking-on system are alone shown); of a system for projection 52 with condenser and projector movable in a direction parallel to the lines of pages; and of a screen 53 of ground glass; the whole being enclosed in a casing 54 which supports the different parts and maintains their relative positions.

The magazine 50 is made up as follows:— Two chains 61 mounted on pinions 62 move in parallel planes. These chains carry forks 63 at regular intervals, in which the ends of the film spools are fixed in such a position that the strengthening rod of the film is held towards the hooking-on device when the roll is in the highest position when the handle 64 which actuates the magazine is turned.

The cinematographic unwinding and winding device 51 is a mechanism which is always ready to grip the roll. It consists essentially of any reversible cinematographic movement which is only represented on the drawings by the toothed drums 65 which first seize the steel strips that will be mentioned below, and then the films. This cinematographic movement is directly connected to the toothed drums 65 and indirectly by belt to the clutch 69 which actuates the film in service, and by belt also, with the winding spool 67. Four strips of flexible steel 66 are provided with equidistant holes like the film itself. These strips, placed two at each end, engage on the toothed drums as in a cinematographic position apparatus. They are wound on to the winding drum 67 placed at the top of the casing and, when the film is hooked on, draw the film in this direction up to the desired page line. In the reverse movement, they follow the film and release themselves automatically when the latter is completely wound up.

The hooking-on device consists of two spring hooks 68, one opposite each end of the film to be gripped. Each of these hooks is fixed between the two corresponding steel strips by a spindle about which it has a certain amount of play in order not to offer any resistance to the necessary deformation of these strips when they are seized between the toothed drums, the hook itself passing between the two rows of rolls.

The hook being in the waiting position, a sector of suitable shape 70 actuated by a hand lever 71 brings the projection 74 up to the corresponding stop on the hook 68. The projection pushes the hook forward and the latter whose nose is raised by the sliding of its sloping under-surface over the strengthening rod 73, is then closed on to this rod by the spring disposed between its two portions. The film is seized and the disc sectors move backwards until the projection 72 is adjacent to the nose of the hook. From this moment, the cinematographic movement can be put into action by means of the ordinary devices.

At the moment when the film begins to unroll, the ends of the reinforcing rod touch unindicated keys each of which liberate a spring, and the hooking disks return to their unhooked position. In this position, when in the reverse movement the film is nearing its complete rolling on each side of its reel, the hook is stopped and opened by the double claw 72, and the film is set free. Everything is then ready, either for seizing again the same film or for seizing another one which is to be brought into a position suitable for presentation.

The projection system is composed of the two parts of an ordinary projector with condenser 75 and objective 76, but it has two pecularities: It has to be able to sweep the page lines in a backward and forward movement; and moreover the two parts, separated by the film, must move in such a way that the axes of the two parts almost coincide. For this purpose the two parts are movable along parallel rails 77. Each is worked by a chain 78 rolling on pinions 79. The two chains are alike as well as the pinions, and the pinions are mounted on the same shaft 80, by which simultaneous movement is effected.

The objective is furnished with an adjusting screw. In addition, another screw enables an operator to put over the objective a reversible optical contrivance in case it is desired to take a photograph or an impression on ferro-prussiate or similar paper of the projected page.

The screen 53 consists of very finely ground glass held in frame 82. The two together, frame and ground glass, are movable. It can be replaced by a frame with transparent glass bearing either a photographic film, or ferro-prussiate or similar paper, as indicated above.

In order to render the drawings clear, the different movements in the apparatus indicated are shown as being caused by small handles. The cinematographic apparatus is not indicated, but, in practice, two motors worked by little handles would be suitable for all operations.

The contrivance thus formed is advantageously combined with an automatic apparatus shown by Fig. 11 and described below: The contrivance shown in Fig. 11 is used for effecting stopping at a desired page denoted by numerals (numerical paging). The contrivances are similar when it is a question of a page sought in a dictionary (alphabetical paging). The dials hereinafter mentioned would in that case carry the twenty-six letters of the alphabet instead of the ten digits.

The current which can set either the film or the objective in motion is likewise used for establishing contacts through the medium of the small wheels 101 between which film 1 passes, when they pass in front of the appropriate hole in this film.

Moreover, dials 102 carry two concentric series of ten digits. On the exterior of this dial is provided an index 103, which is placed by the operator on the figures of the volumes and pages to be consulted. On an interior disk concentric with the dial is a key 104 which determines the closing of a circuit when, on the disk turning, the key is opposite index 103. The disk is mounted on a spring biassed to move clockwise or anticlockwise in the conditions hereinafter described.

The film may be worked, either automatically, by the above-mentioned dials, or by a little handle 105 which is associated with the sector 106 bearing, for example, the legends; Film, Stop, Objective, Forward or Back.

For direct working the action is as follows:—Two small dynamos 107 and 108 operate the film and the objective respectively. When handle 105 is in a position for direct working, that is, on the left of the sector, all the current is cut off from the automatic mechanism and the mechanical controller 109 operates the distribution disk 110. The latter carries a contact means 111. In the position indicated on Fig. 11 it is the film that is assumed to be moving and the disk remains in this position until the automatic mechanism is made use of. At the stop position the contact means is at 112; at 113 it is in position for the automatic moving of the objective.

Change in the direction of the operation of either dynamo is effected by the engagement of the sector contact with handle 105.

The operator can follow the movement of the paging that appears on the screen through the cinematographic movement and can stop the film at any desired moment.

For automatic control the action is as follows:—The indexes 103 are first placed on the figures of the volumes and pages sought. Each of the keys 104 is set at zero on its exterior dial (it will be described later how this can be effected). Then the operator sets the handle 105 to the "automatic position". The movement of the switch determines mechanically the release of the control 109 and the disk 110 comes into position 111. Film 1 is set in motion.

On passing the first holes of the tens of volumes circuit 116 is closed. The electromagnet 117 attracts one of the branches of escapement 118, which frees a cog of wheel 119, and disk 104, biassed by its spring, turns clockwise, to displace key 104 one step. The corresponding circuits of the other dials remain inoperative being open at the spring-controlled switch elements 120.

When the key of the tens of volumes arrives opposite the corresponding index, circuit 121 is closed through electro-magnet 122, which thus closes the switch 120. The same succession of movements is then carried out in the circuit of the volume units, then in the circuit of the thousands, and then of the hundreds, as the small wheels 101 of these circuits are absolutely alike and fixed on both sides to the film. The small wheels 124, 124 (tens and units) on the contrary are movable with the objective; besides they exist only on top, below the film is a ruler of insulating substance parallel to the rails which serve as a guide for the condenser. In this ruler two metal wires corresponding to the two small wheels, tens and units, are stranded. The ruler and the two small wheels become automatically detached at about 1 m. m. of the film when the latter is set in motion.

It should be noticed also that when one of the circuits has been closed on passing a hole the following holes have no further effect on a key 104 and its associated index 103.

The action starting from the hundreds is as follows:—When the hundred hole, indicated by the index, is reached, the electromagnet 123 comes into play. It closes the associated switch 120 and at the same time turns disk 110, so as to put the key 111 in contact with terminals 113. Consequently, the circuit for the film is cut off, and the film stops. The objective circuit is, however, under tension and the objective begins to move from left to right. It passes over the holes and when the key and index are in contact (following a movement similar to that which has already been described) the units are liberated. When the key and unit index are in register the electro-magnet 123 cuts off the objective circuit and everything stops to indicate the page sought.

But the ten or the unit may be not on the line from which the objective started, as a hundred occupies several lines. If it is a question, for example, of the fourth ten of any hundred, the operation is as follows:—In this case, the objective, after having passed over the first and second tens, arrives at page 25. At that moment the objective hurries to the end of its run. In that position it establishes contacts 126, 127, and 128. Contact 126 controls the electro-magnet 129. The circuit through electro-magnet 123 is consequently opened. Disk 110 returns to position 111 of the contact under spring bias. It is necessary to note here that circuit 114, of which the action is about to be described, is only closed by key 115 an instant after the setting in motion of film 111 (a slight slipping of the key); otherwise, as there is a hole 8 at every line the film would be unable to start again.

The objective circuit is thus opened and the film set in motion. But on passing the first hole 8, i. e. at the following line, the small wheels 130 come into play. Circuit 114 is closed. Electro-magnet 131 opens the circuit through electro-magnet 129. Electro-magnet 123 therefore resumes its action and the objective is set in motion again. But contact 128 has acted on a reverser; the objective thus moves again but in the opposite direction. The same movement may be produced at the other end of the course of the objective, which thus effects automatically a backward and forward movement, moving the film on a page line, at each push of the objective, until the moment when the ten and the unit sought are obtained. At that instant, total stoppage takes place through the operation of electro-magnet 125.

By this means an automatic stoppage at a given page has been obtained. If a more distant page should then be desired, to pass, for example, from volume 14, page 3,025, to volume 15, page 6,213, the method of action is as follows:—First of all the objective is brought back to the left by means of controlling handle 105. In this movement, passing from automatic to simple control, a mechanical connection catches an intermediary wheel between the cogged wheels 119 and disks 104, which then have a tendency to move anti-clockwise. The same connection causes anchor 118 to move, which frees the cogged wheel and the liberated dsk brings back all its keys to zero. Then all the indexes are put in position for volume 15—page 6,213. But it is necessary to take care to put the index at 0 for the left figures, which have not changed. For the first figure on the left that changes, and which in the present case must pass from 4 to 5, the index is placed at 5 and the key at 4, since the film has already arrived at the fourth unit of this order. This being done, by setting handle 105 on the "automatic forward" circuit, everything takes place as previously stated 1 does not move. On the second disk, the key being at 4 and the index at 5, after the first hole passed by the volume units, the thousands will be set in motion, and so on.

The operator may desire to pass backwards from volume 15, page 6,213 to volume 12, p. 5, 824. In order to solve this problem one considers the controlling holes of the film in a reverse direction for each unit. Thus the hole that controlled the fourth hundred in a forward direction will control the third hundred in a backward direction. A second interior dial bearing figures in a reverse order to the first dial will allow of the use of this observation.

The procedure will then be as follows:—As in the first case the objective is brought back to the left, and the keys brought back to zero. The movement of these keys can be controlled by means of control studs 132. Place the indexes opposite the figures of the interior dial. Exception is made for the first figures on the left, which do not change. For the latter, it is necessary to put the index and keys at zero (inside dial) which is the same as holding the electro-magnet that closes the circuit of the following unit. This following unit must pass from 5, the point at which the film stopped in a forward direction, to 2, but in reality to 3, as the scale of numbers is raised. Thus the key will be put at 5 (exterior) and the index at 2 (interior). By setting in movement on the automatic return, the desired result will be obtained. In fact, the volume units will meet in succession two holes. At the second, the circuit will be closed. All will take place afterwards as in the forward direction until stoppage at the page desired.

It may therefore be said that the automatic search for a volume and a given page has been solved, as well as the search for a page containing the first letters of a word in the case of a dictionary.

It should be pointed out that the contrivance presented is independent of the cogs on the wheels for cinematographic pulling and independent also of the shape of the pages reproduced. A single element must be constant, that is the width of the interlines, 5 m/m approximately, in order to admit of the placing of the two rows of holes for tens and units. The interlining, (in cases where only a stoppage at a hundred was contemplated) should however, be about 2 m. m. (or 4 m.m.) in projection. One thus loses 3 m.m. per page line, or 3m 30 m. m. in length on the 18 metre film taken as the first example.

In apparatus where the automatic search is limited to hundreds, the arrangement might be such that at the moment of stoppage at the required number a bell could be caused to ring, (as at the end of a line in a typewriter) so as to attract attention. In this case one might retain the automatic switching off of the objective at hundreds and it would be sufficient to stop at any time desired.

To sum up, there is provided in conformity with the invention means enabling public libraries easily to put at the disposal of their readers the most extensive catalogues on films, as well as the most complete bibliographies, as well as dictionaries in general or particular use. These same works printed on paper and in the form of volumes occupy a considerable space. Those which are usually placed at the disposal of students are constantly displaced, mixed together, and their usefulness is thus diminished. Users would find in a single contrivance, without it being necessary for them to displace the films, all that they require.

In the example of Fig. 1 it was supposed that the order of the film was assured by the numbers inscribed in column 11. But one could likewise obtain a cinematographic visual means of checking, by means of signs common to several rows, the following signs only coming visible after a gradual reduction of the speed in unfolding the film, this contrivance rendering it possible to stop the film at the page sought.

The use of letters arranged in rows as in column 11 (Fig. 12) may specially be mentioned, these letters being substituted by each other during the cinematographic projection, so that, during the time of the greatest speed in the unrolling of the film, only the principal letter will be visible, the secondary letters becoming visible one after the other only after a gradual diminution of speed in the unrolling the film.

What I claim as my invention and desire to secure by Letters Patent is:—

1. The herein described method of examining and reading printed and engraved works and the like, which consists in reproducing microscopic photographs of said work by successive pages on a film, placing indications of the paging of said work on said film, advancing said film at a speed at which it is impossible to read the text of said work, projecting said film and stopping said film under the control of said indications at the desired page.

2. The herein described method of examining and reading printed and engraved works and the like, which consists in reproducing microscopic photographs of said work by successive pages on a film, placing indications on said film by inscribing thereon numbers corresponding to the several pages of said work, said numbers being arranged one above the other whereby they may be read cinematographically, advancing said film at a speed at which it is impossible to read the text of said work, projecting said film and stopping said film under the control of said indications at the desired page.

3. The herein described method of examining and reading printed and engraved works and the like, which consists in reproducing microscopic photographs of said work by successive pages on a film, placing on said film indications of the paging of said work which said indications automatically control the movement of the film, advancing said film at a speed at which it is impossible to read the text of said work, projecting said film and automatically stopping said film at the desired page through the agency of said indications.

4. A film comprising miscoscopic images of the pages of a book, said images arranged in lines perpendicular to the direction of the movement of the film, each image comprising a plurality of pages, indications corresponding to the paging of the book and arranged in series perpendicular to the direction of the movement of the film, said successive series presenting a number of common markings arranged on the film in the direction of the movement of the film and beneath one another and said series being substituted one for the other during cinematographic projection.

5. A film comprising microscopic images of the pages of a book, said images arranged in lines perpendicular to the direction of the movement of the film, each image comprising a plurality of pages, numbers corresponding to the paging of the book, the numerals of each number forming a row, the latter being arranged perpendicular to the direction of the movement of the film, said rows succeeding one another and presenting a certain number of common numerals one arranged beneath the other on the film and in the direction of the movement thereof, said numbers being substituted one for the other during the cinematographic projection.

6. A film comprising microscopic images of the pages of a book, said images arranged in lines, each comprising a plurality of pages, the first line of the page and the uneven lines following one another from left to right and the even lines from right to left, markings corresponding to the paging of the book, said markings being arranged in columns and the latter being arranged perpendicular to the direction of the movement of the film, said columns presenting a certain number of common markings arranged in the direction of the movement of the film and beneath one another, said columns, moreover, being substituted one for the other during the cinematographic projection.

7. A film comprising microscopic images of the pages of a book, said images arranged in lines each comprising twenty-five pages, the first line of the page and the odd lines following one another from left to right and the even lines from right to left, markings corresponding to the paging of the book, said markings being arranged in columns and the latter being arranged perpendicular to the direction of the movement of the film, said columns presenting a certain number of common markings arranged in the direction of the movement of the film and beneath one another, said columns moreover, being substituted one for the other during the cinematographic projection.

8. A film comprising microscopic images of the pages of a book, said images arranged in lines each comprising a plurality of pages, series of alphabetical classification letters corresponding to images of preceding pages, said series of letters being arranged in rows perpendicular to the movement of the film, said series comprising a certain number of common letters arranged on the film beneath one another in the direction of the movement of the film, said series moreover, being substituted one for the other during the cinematographic projection.

9. In an apparatus for reading a film carrying microscopic images of the pages of a book with indications corresponding to the paging of the book, said apparatus comprising a cinematographic winding and unwinding device for a film, means controlling the speed of said device, stopping means for said device, a cinematographic projection, and a screen on which the image of the film is projected, whereby the indications of the film projected on the screen may be read and the advance of the film stopped as desired to read the image of the film on the screen.

10. In an apparatus for projecting a film carrying microscopic images of the pages of a book arranged in lines and visible indications, said apparatus comprising a cinematographic winding and unwinding device for the film, movable projecting means for projecting the images and indications of the film, disconnecting means for the said cinematographic device for stopping at a line of pages, actuating means moving the projecting means in a direction perpendicular to the direction of the movement of the film for the purpose described.

11. In an apparatus for reading a film carrying microscopic images of the pages of a book arranged in lines of a plurality of pages and indications corresponding to the paging of the book, said apparatus comprising a cinematographic projector including a condenser and a projector mounted on parallel rails, a train of gears having a common entraining shaft, two endless chains engaging said gears and carrying, respectively, the condenser and the projector whereby the condenser and projector may be moved simultaneously parallel to the lines of the pages and a screen on which the image of the film is projected whereby the indications of the film projected on the screen may be read and the cinematographic device stopped as desired to read the image of the film on the screen.

12. In an apparatus for reading films comprising indications corresponding to the paging of a book, said apparatus comprising two endless chains, pinions engaged by said chains whereby said chains move in parallel vertical planes, forks fixed at intervals to said chains and supporting rolls of films, a crank actuating the pinions to place a selected film in securing position, a cinematographic winding and unwinding device for the film, means controlling the speed of said device, stopping means for said device, a cinematographic projector and a screen on which the image of the film is projected, whereby the indications of the film projected on the screen may be read and the said device stopped as desired to read the image of the film on the screen.

13. The combination of a device for projecting a film carrying microphotographically reproduced pages of a book, with a mechanism for reeling off the film, means for disengaging said mechanism from the film, and a regulating device, the said disengaging means being controlled by the film and the regulating device to stop the film at the page desired.

14. The combination of a device for projecting a film having perforations and carrying microphotographically reproduced pages of a book, with a mechanism for reeling off the film, means for disengaging said mechanism from the film, and a regulating device, the said disengaging means being controlled by the perforations of the film and by said regulating device to stop the film at the page desired.

15. The combination of a device for projecting a film carrying microphotographically reproduced pages of a book with cinematographic winding and unwinding reels for the film, an electric motor controlling the winding operation, a regulating device, electric contacts controlling the circuit of said motor and being controlled by the film and said regulating device to stop the film at the page desired.

16. The combination claimed in claim 15, in which said film is perforated and said electric contacts are controlled by the perforations of said film and said regulating device to stop the film at the page desired.

17. In a device for projecting a film carrying microphotographically reproduced images of the pages of a book, said images being arranged in a line perpendicular to the direction of the movement of the film, a winding mechanism for the film, a projection apparatus being perpendicularly movable with respect to the film, actuating means controlling the projection apparatus, means for disconnecting the winding mechanism from the film, the latter controlling said disconnecting means, second disconnecting means for disengaging the said actuating means from the projection apparatus, said second means being equally controlled by the film, a regulating device controlling both disconnecting means to assure first stopping of the film at the line of the page and thereafter stopping of the projection apparatus at the page chosen.

18. In a device for projecting a film carrying microphotographically reproduced images of the pages of a book, said images being arranged in lines perpendicular to the direction of the movement of the film, a winding mechanism for the film, a projection apparatus being perpendicularly movable with respect to the film, an actuating device movable in two directions controlling said projection apparatus, means for disconnecting the winding mechanism of the film, said disconnecting means being controlled by the film, a second disconnecting means for disconnecting the winding mechanism of the film, said second means controlled by the projection apparatus at the ends of its path, further disconnecting means for the said actuating device, said latter disconnecting means being controlled by the film, a regulating device controlling said three disconnecting means to produce first stopping of the film at a line of pages, then displacement of the projection apparatus along said line of pages, then displacement of the film for one line and then stopping of the film and final displacement of the projection apparatus along this new line of pages and stopping the same at the page looked for.

19. In a device for projecting a film carrying numbers and microphotographically reproduced images of the pages of a book, cinematographic winding and unwinding mechanisms, means for hooking on and controlling the reeling of the film on the winding and unwinding mechanisms and a device for projecting the images of said film and the numbers thereon, means for disconnecting the cinematographic winding and unwinding mechanism to stop the film at the page looked for.

20. In a device for projecting a film carrying visible numbers and microphotographically reproduced images of the pages of a book, cinematographic winding and unwinding mechanisms, a hook-on device for advancing the film on the winding and unwinding mechanisms, a movable magazine carrying a plurality of films, an actuating device for the magazine connecting the film wanted to the hook-on device, a projecting device for projecting the film and the numbers on said film, disconnecting means for the said two mechanisms to stop the film at the page wanted.

21. A device as claimed in claim 20, in which said actuating device for the magazine brings the film selected in hook-on position, the device further comprising another actuating device for the hook-on mechanism to hook on the film selected and for advancing the film by said cinematographic winding and unwinding mechanisms, substantially as described.

In testimony whereof I have affixed my signature.

GEORGES SEBILLE.